United States Patent [19]
Duffy

[11] Patent Number: 5,640,506
[45] Date of Patent: Jun. 17, 1997

[54] INTEGRITY PROTECTION FOR PARITY CALCULATION FOR RAID PARITY CACHE

[75] Inventor: Darrell Duffy, Sunnyvale, Calif.

[73] Assignee: MTI Technology Corporation, Anaheim, Calif.

[21] Appl. No.: 388,931

[22] Filed: Feb. 15, 1995

[51] Int. Cl.[6] ............................................. G06F 11/00
[52] U.S. Cl. .............................. 395/182.04; 395/185.02; 371/49.1
[58] Field of Search .................... 395/182.03, 182.04, 395/182.05, 185.05, 185.02, 185.07; 371/40.1, 49.1, 57.1

[56] References Cited

U.S. PATENT DOCUMENTS

| | | | |
|---|---|---|---|
| 5,121,396 | 6/1992 | Irvin et al. | 371/53 |
| 5,341,381 | 8/1994 | Fuller | 371/10.1 |
| 5,373,512 | 12/1994 | Brady | 371/40.1 |

*Primary Examiner*—Robert W. Beausoliel, Jr.
*Assistant Examiner*—Norman M. Wright
*Attorney, Agent, or Firm*—Townsend and Townsend and Crew LLP

[57] ABSTRACT

An improvement on the use of parity and a write cache for a RAID by adding a check code for the parity data itself. In addition, the time during which the parity check code is unprotected is reduced by using a single loop to calculate the old parity check code and verify it, determine the new parity information itself from the new write data, and calculate the new parity check code. Rather than cycle through all the parity blocks to calculate the old check code, and verify that it matches what is stored, the old check code is reconstructed block-by-block as the new parity is generated for each block in a loop. In addition, the new parity check code is constructed bit-by-bit at the same time.

6 Claims, 4 Drawing Sheets

INTEGRITY PROTECTION FOR PARITY CALCULATION FOR RAID PARITY CACHE

BACKGROUND OF THE INVENTION

The present invention relates to parity generation, in particular parity calculations in conjunction with the write cache for a RAID system.

In a RAID (redundant array of independent disks) system, a number of small disk drives are used to store data with the data being spread across a number of the disk drives. An example of such a system is set forth in U.S. Pat. No. 5,140,592. A number of schemes exist for correcting errors and detecting corruption of the data. When the data is received from a host computer by a RAID controller, it typically arrives in 8-bit byte form, with a ninth, parity bit for each byte. The controller writes the data across a number of disks, putting different blocks of data in different disks. Data is usually written a sector at a time, such that blocks of the data for that sector are written across the sectors on four disk drives, for instance.

Typically, the RAID controller as it writes the data will generate a check code. One example, is CRC (cyclic redundancy check). This is basically an exclusive OR (XOR) of each bit position in successive bytes throughout a sector. Another example is linear parity, which is an exclusive OR (XOR) function of successive words of any convenient length. Finally, there is Reed Solomon codes, which use polynomials to produce P and Q terms, as discussed in more detail in U.S. Pat. No. 5,140,592.

In addition to these check codes, the RAID controller also provides a parity calculation. The parity is the exclusive OR of the data blocks in each disk drive, with the exclusive OR being a parity block which is stored on a separate, parity disk. Thus, for example, if four data disks are used, there is a fifth disk added for parity (RAID 3), or the parity sectors may be distributed among all the drives (RAID 5). Typically, the parity calculation is done not only on the data itself, but on the check codes which are stored with the data on each disk drive. In addition, each disk drive sector may have a header field, which uniquely identifies the location of that data sector in the disk drive RAID memory. The header thus self-describes its location, allowing a determination of where it belongs without the disk controller keeping track of it. Typically, the parity drive will have a header field which is the exclusive OR of the headers of the data sectors.

When a write operation is done to data in the RAID array, it may be a write to just a portion of the data which is stored on one of the disk drives. Typically, an entire sector is written even if only a portion of the data on that sector is changed. In order to accomplish this write, it is not necessary to read all of the disk drives in the four plus one grouping. Rather, the data sector to be written can be read, along with the parity sector. By exclusive ORing the data sector with the parity sector, a new parity is generated which is equivalent to the parity for the remaining disk drives which have not been read. Then, the new data can be exclusive Ored with its new parity to generate a parity for all four disk drives with the new data. Then, the new data and the new parity can be written to the disk drives.

Before performing this operation, typically the check code is recalculated after the data is read by the controller to determine that the data has been accurately read. This requires regenerating the check code by looping through all the data to perform the function necessary to generate the check code. Once this is accomplished, and the data is verified as being valid, the process of calculating a new parity can be done.

Some disk controllers use a write cache so that multiple writes can be done without accessing the disk drives themselves. The same process is followed, except that the data sector and parity sector are stored in the write cache for an extended period of time, allowing multiple writes to be done before the data is written back to the disk drive. Storing the data in the write cache for an extended period of time increases the risk that the data could be corrupted due to some other operation which writes over the data, due to a power failure, or otherwise. One approach to the risk of a write cache is to store the parity data in a separate memory. Such a system is shown in U.S. Pat. No. 5,239,640 (parity is called "check-sum" in this patent).

Since a write cache is typically more volatile than a disk drive, the parity information is at risk of being corrupted in the write cache. The data is protected by a check code, but the parity information contains parity of the data check codes and is not itself separately protected.

SUMMARY OF THE INVENTION

The present invention improves on the use of parity and a write cache for a RAID by adding a check code for the parity data itself. In addition, the time during which the parity check code is unprotected is reduced by using a single loop to calculate the old parity check code and verify it, determine the new parity information itself from the new write data, and calculate the new parity check code. Rather than cycle through all the parity blocks to calculate the old check code, and verify that it matches what is stored, the old check code is reconstructed block-by-block as the new parity is generated for each block in a loop. In addition, the new parity check code is constructed bit-by-bit at the same time.

After the conclusion of the loop in which the new parity for the new write data is determined, only at that time will the old check code have been calculated so that it can be verified that there was not an error when the parity data was read from the disk and written into the write cache. At the same time, the new check code is also available. This technique minimizes the amount of time during which the parity information is not protected by a check code.

The present invention, in addition to adding the check code for the parity sector, uses a header for the parity data which is self-describing, rather than being an exclusive OR of the data headers. Thus, the location of the parity information can be self-described from the parity header. This does not degrade the information available since the parity of the headers of the prior art is not necessary to protect those headers. When the data is read out of the disk drives and stored in the controller, the controller independently stores information indicating where that data came from, and thus the header information is not needed and need not be protected by parity.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
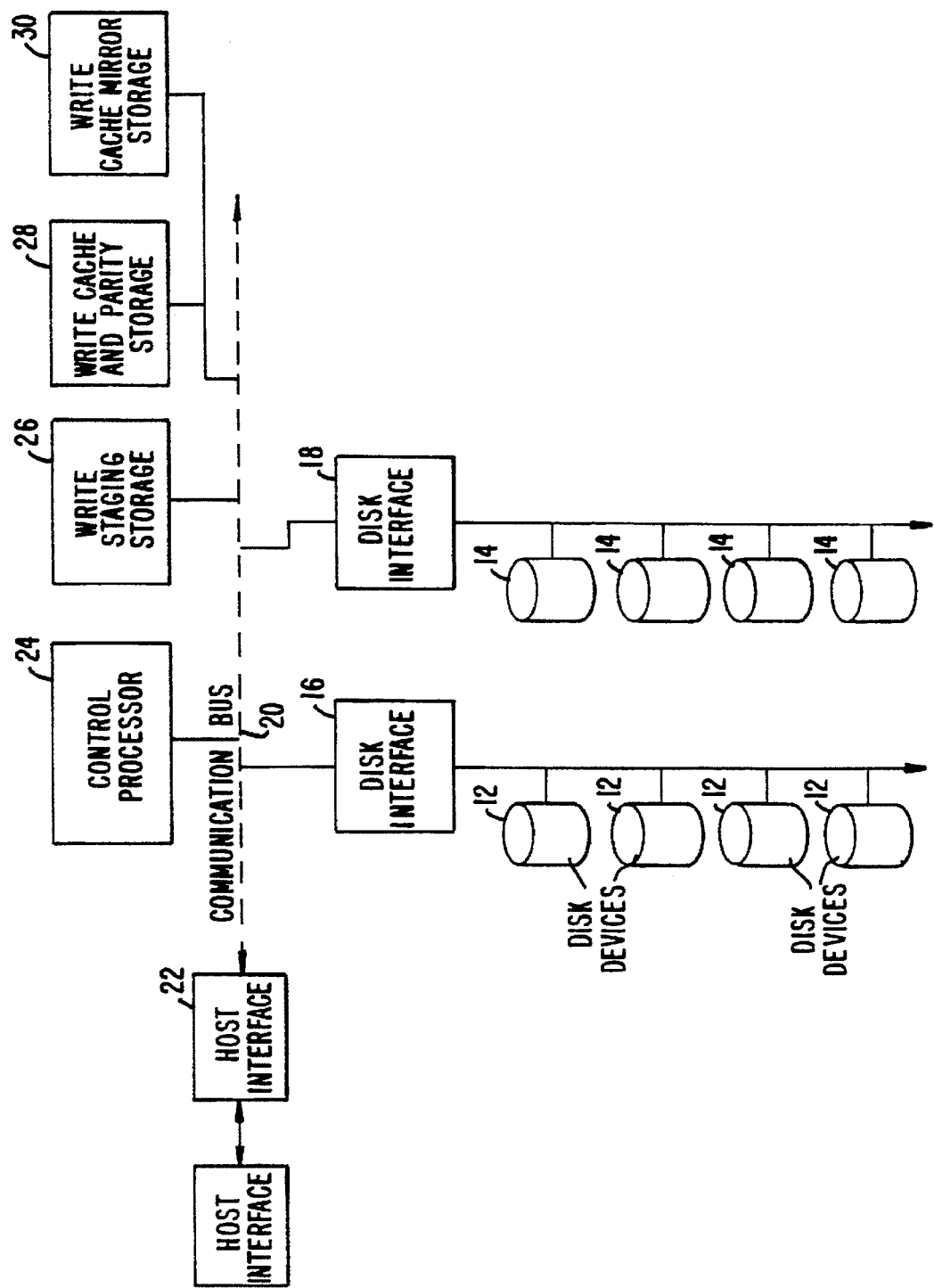
FIG. 1 is a block diagram of a RAID system incorporating the present invention.

FIG. 1 shows an example of a small RAID system with a plurality of disk drives 12 and 14, each connected through a disk interface 16 and 18, respectively. The disk interface is connected to a communication bus 20 which is connected to a host interface 22. Control of data flow to and from the disk interface is done by a control processor 24. A write staging storage memory 26 is used to temporarily hold data while control processor 24 is transferring data between host interface 22 and disk interface 16 and 18.

A write cache 28 is also provided, along with a mirror write cache 30 for added protection of the data. The write cache is used to store data more than temporarily, as opposed to staging storage 26, which only temporarily stores the data during its flow between the interfaces. The write cache 28 can thus be used to accumulate a number of writes, which then can be written at one time to the appropriate disk drives without requiring a disk drive access each time. This saves time since the disk drive access is considerably slower than a write cache access, requiring mechanical rotation of the disk to the appropriate sector.

Figure 2:
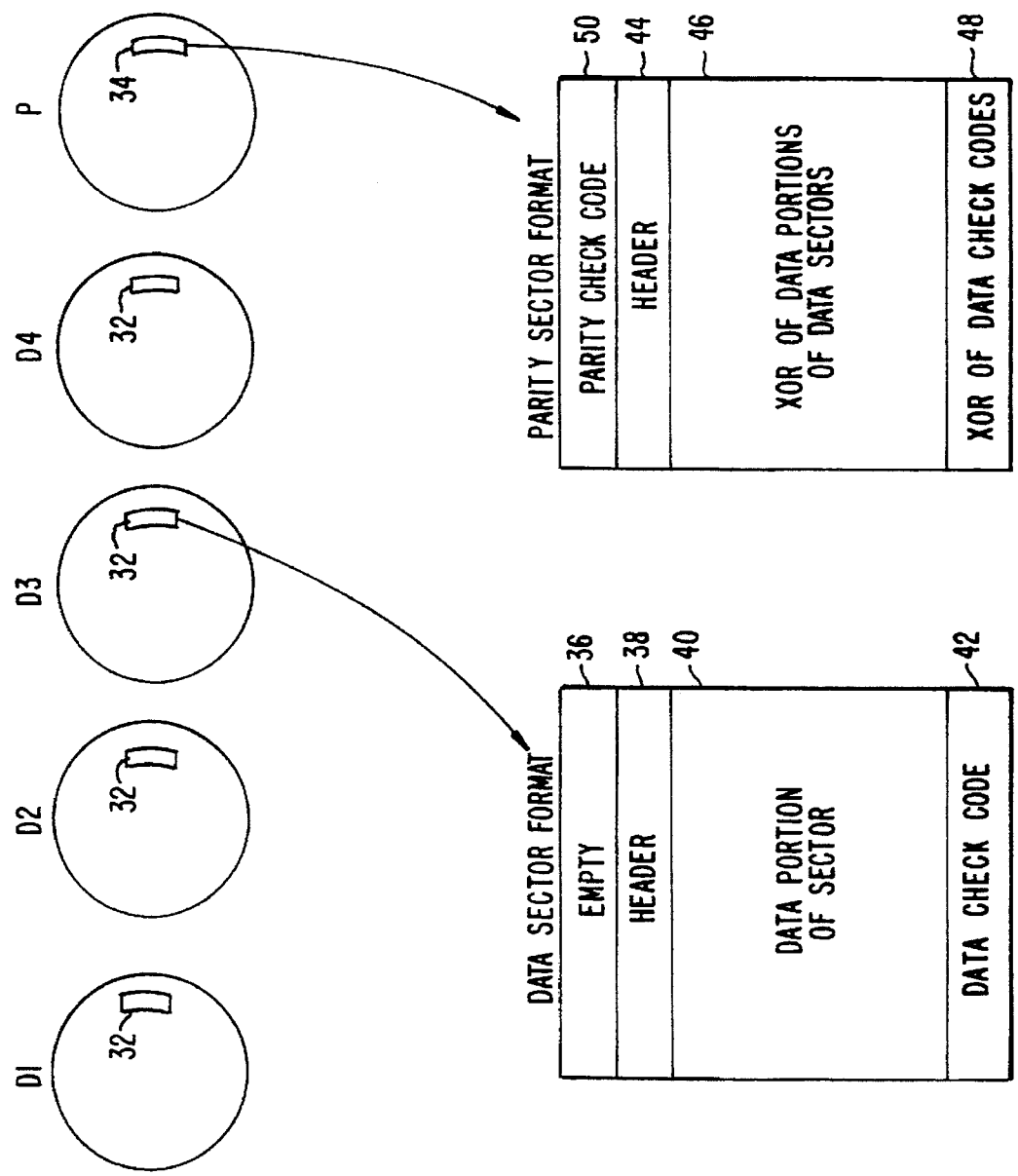
FIG. 2 is a diagram illustrating the data and parity sector formats.

FIG. 2 is an illustration of one embodiment of a RAID system having four disk drives D1–D4 arranged in a group, with a single parity drive P for that same group. Each of the disk drives will have a sector 32 where the data is written. Four sectors of data are written across these four areas 32 on the disk drives D1–D4. A parity drive P includes a sector 34 which contains the exclusive OR of the data in the four sectors 32 on disk drives D1–D4.

If, for example, it is desirable to write data to a sector in disk drive D3, that sector is read into the controller's memory, along with the corresponding parity sector. Data is typically rewritten such that an entire sector 32 is replaced, rather than just a group of data in that sector. New parity can be generated without reading the data on drives D1, D2 and D4. This is possible by doing an exclusive OR of the old data on D3 with the parity data. This essentially subtracts out the D3 data from the exclusive OR information in the parity, leaving it as the exclusive OR of the data in disk drives D1, D2, and D4. Subsequently, the new data to be written to D3 can be exclusive Ored with the parity data, to produce parity data which is the exclusive OR of D1, D2, D3, and D4. Then, the data can be rewritten to disk drive D3, with the parity being written to parity drive P.

FIG. 2 illustrates the data sector format as having an empty portion 36 and a header 38. Header 38 describes the location of that sector on disk drive D3, and the fact that it is on disk drive D3. Data sector 40 includes a number of data blocks. Data check code portion 42 contains a check code derived from data portion 40. This can be a Reed Solomon or other code which allows checking the validity of the data in area 40, or can allow the reconstructing of this data.

The parity sector of the prior art would have a header 44 which would be the exclusive OR of the header 38 for each of disk drives D1–D4. Similarly, a data portion 46 of parity information is the exclusive OR of the data portions of the data sectors of disk drives D1–D4. Finally, a check code portion 48 contains the exclusive OR of all the data check codes.

The present invention adds a parity check code 50. This check code provides a check on the information in the remainder of the parity sector. In addition, header 44 of the present invention for the parity sector is not the exclusive OR of the headers 38 of the data sectors. Rather, an independent header for the parity sector describing its location on parity drive P and the location of sector 34 is provided. Thus, check code protection of the parity information is provided.

Figure 3:
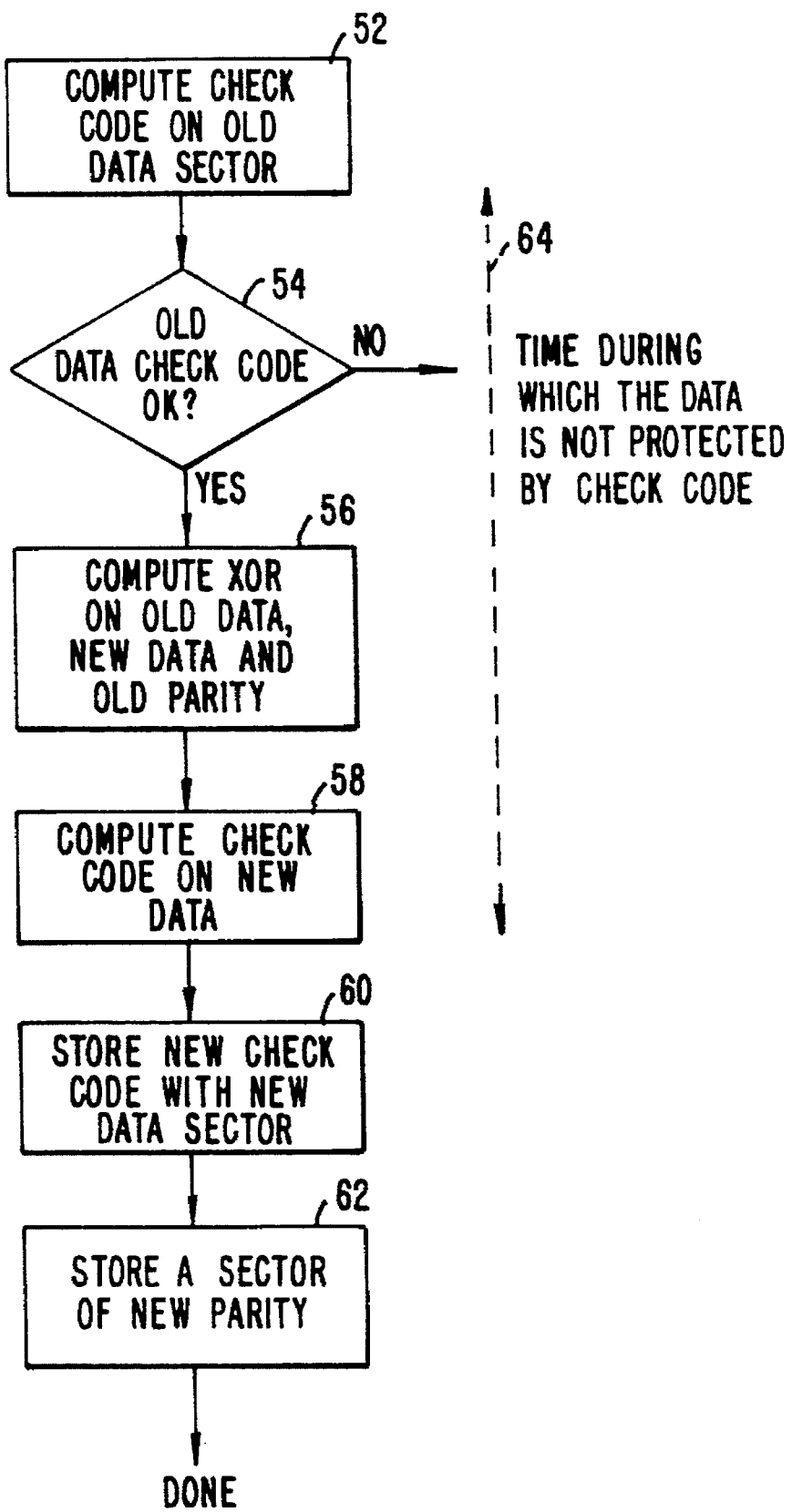
FIG. 3 is a flow chart illustrating the prior art method of calculating parity and completing check codes.

FIG. 3 is a flow chart illustrating the prior art method of checking data in the data write cache and computing new parity. When data is first loaded into the cache, the check code is recomputed to determine that there has not been an error in writing the data from the disk drive to the cache. This is done in a step 52 in FIG. 3. Since the check codes are only with the data sector, the prior art does not perform this function for the parity information. The data is read by the processor block-by-block, and the check code is calculated. For instance, if the check code is an exclusive OR function using the CRC, the data blocks are exclusive Ored with each other one-by-one as they are cycled through a register in the control processor 24 of FIG. 1. After the control processor loops through all the blocks in the sector, the check code will have been regenerated, and can be compared with a check code read from memory. If this check code is okay (step 54), the data is valid and the new parity can now be calculated for the new data. This is done, as described before, by doing an exclusive OR of the old parity and old data to subtract out the old data, and then exclusive Oring this intermediate parity with the new data to generate the new parity. Again, this is done block-by-block by cycling through each block of data and parity in step 56. After the new parity has been generated, a new check code needs to be computed on the new data which is being written in place of the old data in the disk drive. This new check code is computed in the same manner, reading the data block-by-block into the control processor registers, while doing an exclusive OR or other function to generate the new check code. Once the processor has looped through all the data in step 58, a new check code is calculated and can be written with the new data. The parity version of this new data check code can be calculated in the same manner as the parity for the data, by doing an exclusive OR with the old data check code, to subtract out the old data check code, and then doing an exclusive. OR with the new data check code to provide a new exclusive OR of the data check codes in the parity sector for the data check codes of disk drives D1, D2, and D4, along with the new check code of the new data to be written to disk drive D3. Finally, the new parity check code which is an exclusive OR of the data check codes is stored in step 60 along with the new sector of new parity (step 62).

As can be seen, there is a period time, indicated by arrow 64, during which there is no check code protection for the data. Simply applying this same process to parity information would leave it unprotected for the same period. The present invention seeks to close this window, and in addition, to simplify the process.

The data is protected by a check code as well, but the data check code is not recomputed with each operation, since the data does not change. The same cannot be said for the parity information itself, although the present invention does protect it with a parity check code. The parity check code, however, is the only protection for this parity information, and thus it is more critical to not have it unprotected for the length of time shown for data check codes in FIG. 3.

Figure 4:
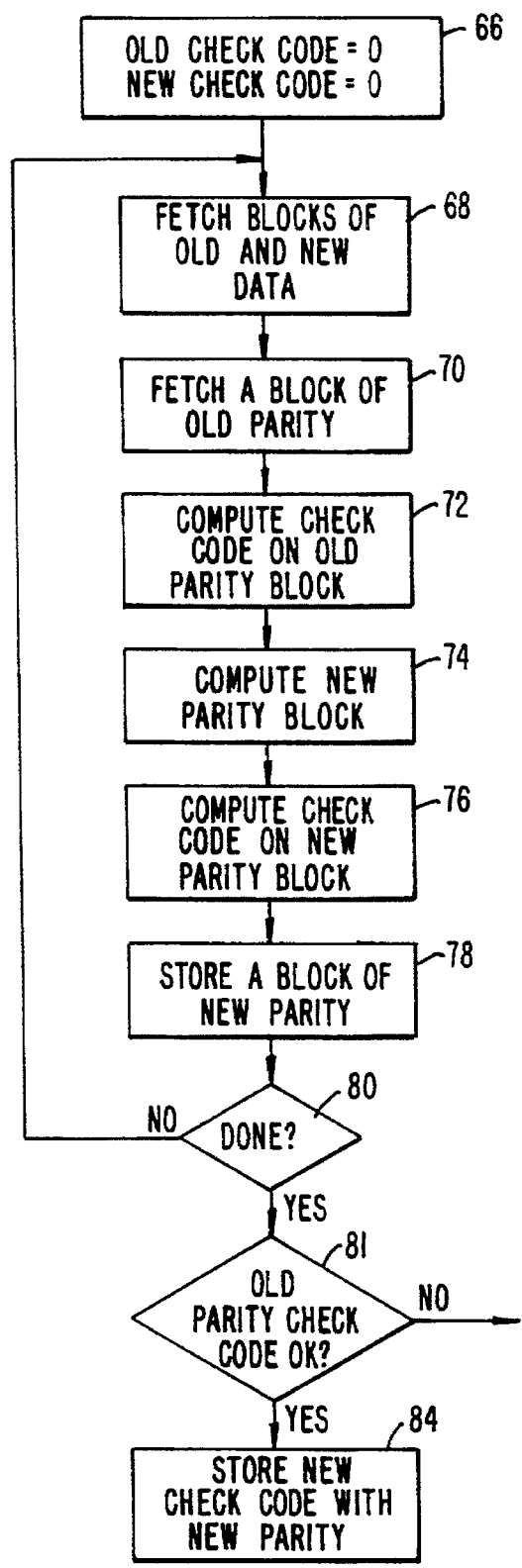
FIG. 4 is a flow chart of the method of the present invention for calculating parity and check codes.

FIG. 4 is a flow chart of the method of the present invention. In an initialization step 66, the old and new check code are stored in a processor register, but initialized at zero. The processor will then fetch blocks of both old and new data (step 68) and fetch a block of old parity (step 70). The check code on the old block of parity data is then calculated for that block only (step 72). The process for completing the check code on the old data block is done similarly, but is not independently shown.

The new parity block is then calculated (step 74). This is done as part of the same loop for that block including step 72. Thus, instead of completing the check code on all of the parity blocks by looping through 72, and then going on to complete the new parity block, as in the prior art, they are both combined on a block-by-block basis in the same loop.

Subsequent to step 74, the check code on a new parity block is calculated for that block (step 76). The new check code will not be complete until all of the blocks have been circulated through the loop. Finally, a block of new parity is stored (step 78) and the process is repeated (step 80) until all the blocks of the sector have been cycled through. Only after all the blocks have been cycled through will the old parity have been calculated so that that comparison can be done (step 82). Thus, instead of the old parity of step 84 being determined prior to going through the loop to calculate the new parity and prior to a loop for calculating a new check code, this information is not available until all the blocks have been cycled through to generate the new parity. Also, only at that point will the new check code for the new parity be completely calculated, and can be stored (step 84).

An example of a program for carrying out the loop of FIG. 4 follows:

```
int           i;
Boolean       goodXOR;
CRC           oldcrc = 0;
CRC           newcrc = 0;
for (i = 0; i < sectorsize; i++)
{     oldcrc = MAKECRC( oldcrc, parity[i] );
      parity[i] = XOR( parity[i], data[i] );
      newcrc = MAKECRC( newcrc, parity[i] );
}
goodXOR - CHECKCRC( oldcrc, savedParityCRC );
if (goodXOR)
{     savedParityCRC = newcrc;
      return SUCCESS;
}
else
{     return BADPARITYSECTOR;
}
```

The present invention thus essentially combines three loops into one, calculating both the old check code, a new check code, and the parity data itself during a single loop. This insures that as each block of data is returned from the controller registers to the write cache, it is accompanied by its new parity at that time, so that it remains protected, and the new parity check code is still in process and being calculated in the registers, and is not exposed in the write cache to corruption.

The present invention provides better protection for the parity sectors which are cached in the write cache, rather than waiting for the time of a write operation to read the parity sector from a disk drive to recompute the parity. In this way, READs can be better scheduled to take advantage of disk head position, and thereby improve performance for the disk controller. In addition, caching parity sectors allows writes to accumulate for different drives in the same parity group. This reduces the number of READ/WRITE operations in the parity sectors.

The present invention also allows the parity sectors to be protected by a check code by adding a field for a check code for the parity data. Even with this addition, the prior art method of computing check codes would compute the old check code first, and then the exclusive OR of the new check code, requiring multiple passes through the data as discussed above. The one pass technique of the present invention makes a check code for the parity information more effective for a number of reasons. First, the loop overhead is amortized across the multiple passes. Second, the CPU data cache can be used to hold the data and parity data during the loops. Third, the time during which the parity sector and memory may be corrupted without detection is decreased. Finally, a simpler design for the memory system is possible while at the same time providing higher reliability for the data in the event that parity is used to recover data.

The present invention actually leaves the data unprotected for only a couple of instruction times or hardware memory cycles. By conditioning the compiler to generate instructions to perform the operations using registers, the parity sector data is actually only unprotected in registers in the central processing unit. The parity sector data is protected in memory outside the registers. Since registers are a more secure storage, the data is more secure than in memory. Registers are more secure, both because of their structure, and because they are not accessible to other processors in a system, as other memory is.

Advantages of caching parity sectors in memory include:
1. By reading parity sectors in advance of their requirement to do the write operations, the reads can be better scheduled to take advantage of disk head position, and thereby improve performance of the disk controller.
2. There is an advantage to caching parity sectors to allow writes to accumulate to different drives in the same parity group. This reduces the number of read/write operations to the parity sectors.

This invention allows parity sectors to be protected by check codes while cached in memory to achieve the above advantages.

The obvious way to implement check codes, based on what the prior art teaches, would be to compute the old check code and then compute the XOR and the new check code, using either 2 or 3 passes through the data. By using the one pass technique of the present invention, the advantages are:
1. Amortization of the loop overhead across the passes.
2. Increasing the benefit of the CPU data cache to hold the data and parity data during the loops.
3. Decreasing the time during which the parity sector in memory may be corrupted without detection.
4. Allowing simpler designs for memory systems for disk controllers while at the same time providing higher reliability of data in the event that parity is used to recover data.

The self-describing parity sectors of the present invention allow parity sectors to be recovered from a write cache mirror storage rather than being discarded in a recovery operation. This preserves work done before the failure and decreases the time required to accomplish the recovery. If parity sectors cannot be recovered from the write cache mirror, then these sectors must be regenerated from the constituent data sectors.

As will be understood by those familiar with the art, the present invention may be embodied in other specific forms without departing from the spirit or essential characteristics thereof. For example, a parity check code could be added, while still using the multiple loops of the prior art. Alternately, multiple loops could be used without adding the parity check code. Finally, multiple loops could be used, while maintaining the parity sector header as an exclusive OR of the data sector headers. Of course, the entire algorithm could be implemented in hardware, with or without microcode. Accordingly, the disclosure of the preferred embodiments of the invention is not intended to be limiting of the invention, but illustrative. The scope of the invention is set forth in the following claims.

What is claim is:

1. In a disk controller for a RAID arrangement of disk drives, the disk controller having a write cache, a method for calculating parity comprising the steps of:
   (a) fetching an old block of data, a new block of data, and an old block of parity;
   (b) computing a partial check code on said old block of parity;
   (c) computing a new parity block from said old block of data, said old block of parity, and said new block of data;
   (d) computing a partial check code on said new block of parity; and
   (e) repeating steps (a)–(d) for each block in a sector until a complete check code on said old block of parity and said new block of parity is calculated,
   wherein parity blocks are not generated for data header blocks.

2. In a RAID arrangement of disk drives, a method for storing parity comprising the steps of:
   storing parity blocks on a plurality of data sectors, said parity blocks covering data blocks of said data sector and data check code blocks of said data sectors;
   not storing parity blocks for header field blocks of said data sectors; and
   storing a parity header for a parity sector in a field corresponding to a header field of data sectors;
   wherein said parity sector header self-describes the location of said parity sector in said RAID arrangement.

3. The method of claim 2 further comprising the step of:
   including said parity sector header in the computation of the check code for the parity sector.

4. The method of claim 3 wherein said check code comprises a cyclic redundancy check (CRC).

5. The method of claim 2 wherein said parity blocks are an exclusive OR of data blocks or data check code blocks on a plurality of said disk drives.

6. In a disk controller for a RAID arrangement of disk drives, the disk controller having a write cache, a method for calculating parity comprising the steps of:
   (a) fetching an old block of data, a new block of data, and an old block of parity;
   (b) computing a partial check code on said old block of parity;
   (c) computing a new parity block from said old block of data, said old block of parity, and said new block of data;
   (d) computing a partial check code on said new block of parity;
   (e) repeating steps (a)–(d) for each block in a sector until a complete check code on said old block of parity and said new block of parity is calculated;
   (f) storing a header for a parity sector in a field corresponding to a header field of data sectors;
   (g) storing said check code for said parity in said header for said parity sector; and
   (h) storing said header for said parity sector both in said write cache and on one of said disk drives.

* * * * *